C. A. LITTLEFIELD.

Fire Place.

No. 2,074.

Reissued Sept. 26, 1865.

Witnesses.
John W. Dale
Newton W. Champion

Inventor
Knight Brothers Attorneys
For C. A. Littlefield

N. PETERS, Photo-Lithographer, Washington, D. C.

UNITED STATES PATENT OFFICE.

CALVIN A. LITTLEFIELD AND DAVID BOYLE, OF COVINGTON, KENTUCKY, ASSIGNEES OF CALVIN A. LITTLEFIELD.

IMPROVEMENT IN FIRE-PLACES.

Specification forming part of Letters Patent No. 29,980, dated September 11, 1860; Reissue No. 2,074, dated September 26, 1865.

*To all whom it may concern:*

Be it known that CALVIN A. LITTLEFIELD, of Covington, Kenton county, Kentucky, did invent a certain new and useful Improvement in Fire-Places; and we do hereby declare the following to be a full, clear, and exact description thereof, reference being had to the accompanying drawings, making part of this specification.

This invention relates to, first, the provision of a hood or bonnet depending from the lower edge of the breast to give proper direction to the draft and smoke; second, an arrangement of hollow crown and of hot and cold air passages, whereby fresh air may be heated and conducted to any part of a building.

Figure 1:
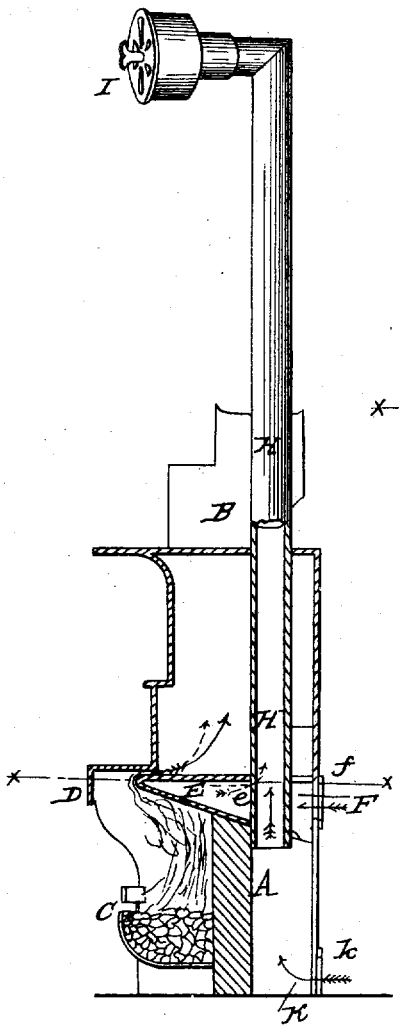
Figure 2:
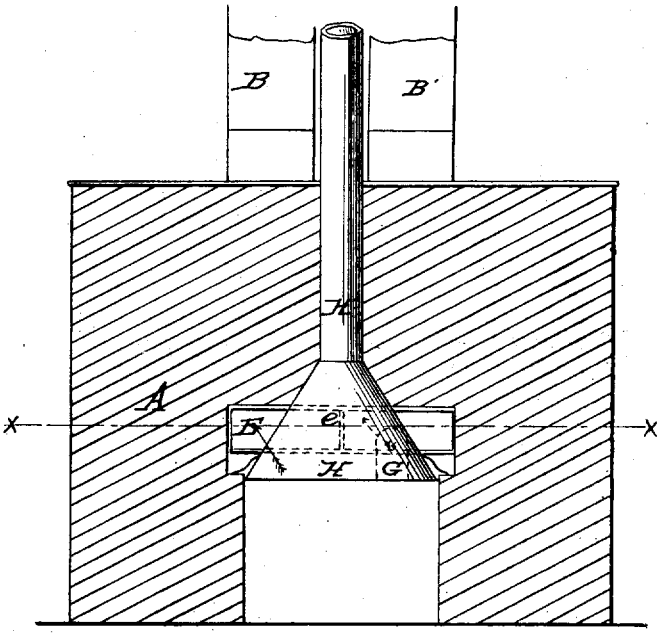
Figure 3:
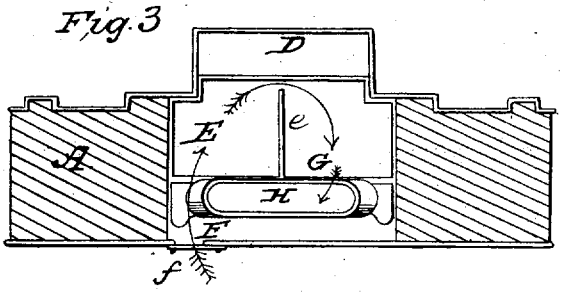

Figure 1 is a vertical section of a fire-place embodying our improvements. Fig. 2 is an elevation of the back part, the wall being omitted. Fig. 3 is a horizontal section on lines *x x*, Figs. 1 and 2.

A is a portion of the masonry or setting of the fire-place. B B′ are flues. C is the grate.

In order to insure the passage of the entire body of smoke into the chimney-throat, and at the same time to direct the draft into the fire, we provide a hood or bonnet, D, composed of a plate which projects horizontally from the margin of the chimney-breast, and has a flange or verge depending from its outer edges.

E is a chamber, in which cold air from the outside of fire-place is allowed to circulate and become heated. The said chamber E is set in the brick-work, as shown, directly over the grate, and communicates with the outside of the fire-place by an opening, F, and through an opening, G, with a tube, H, which passes upward between flues B and B′, and serves to carry the heated air to parts of the building desired to be warmed. The conveying-tube H is provided with suitable registers, I. The heater E is fitted with a partition, *e*, devised to cause the air to properly circulate through the heater before entering the tube H. The direction of the current of air is represented by arrows.

The opening F is provided with a door, *f*, used to regulate the supply of cold air to the heater. An opening, K, provided with a suitable door, *k*, is allowed at times to supply cold air to the conveying-tube H, with which it directly communicates, to unite with the air passed through the heater E, and thus to regulate the temperature of the air which traverses the tube H to suit the requirements of rooms being heated. By proper adjustment of doors *f* and *k* the temperature of the air which flows through the tube H may be regulated as desired.

We are aware that chambers have been applied behind and around fire-places to heat air and supply the same to other apartments, and also that arching crowns have been employed having the same relation to the fire and flue as the hollow crown E.

We claim as new and of our invention herein—

1. The provision or attachment to an open fire-place or grate of the bonnet D, constructed and applied to catch the smoke and form a ledge or shelf over the fire, substantially as set forth.

2. The arrangement of the bonnet D, hollow crown E, partition *e*, tube H, flues B B′, apertures K F G, and doors *f* and *k*, constructed, combined, and operating in the manner and for the purposes set forth.

In testimony of which invention we hereunto set our hands.

CALVIN A. LITTLEFIELD.
DAVID BOYLE.

Witnesses:
GEO. H. KNIGHT,
JAMES H. LAYMAN.